(12) United States Patent
Cheung et al.

(10) Patent No.: US 7,443,804 B2
(45) Date of Patent: Oct. 28, 2008

(54) METHOD AND APPARATUS OF ESTIMATING AVAILABLE BANDWIDTH ON A PACKET NETWORK

(75) Inventors: Benjamin Cheung, Lake Hiawatha, NJ (US); Nidal N Khrais, Flanders, NJ (US); Gopal N Kumar, Bridgewater, NJ (US); Anthony Edward Putman, Chippenham (GB)

(73) Assignee: Lucent Technologies Inc., Murray Hill, NJ (US)

( * ) Notice: Subject to any disclaimer, the term of this patent is extended or adjusted under 35 U.S.C. 154(b) by 641 days.

(21) Appl. No.: 10/998,709

(22) Filed: Nov. 29, 2004

(65) Prior Publication Data

US 2006/0114834 A1 Jun. 1, 2006

(51) Int. Cl.
*H04L 1/00* (2006.01)
(52) U.S. Cl. ..................................... 370/252
(58) Field of Classification Search .............. None
See application file for complete search history.

(56) References Cited

U.S. PATENT DOCUMENTS

| | | | |
|---|---|---|---|
| 6,614,763 B1 * | 9/2003 | Kikuchi et al. | 370/252 |
| 6,850,541 B2 * | 2/2005 | Gross | 370/473 |
| 2002/0116154 A1 | 8/2002 | Nowak et al. | 702/186 |

OTHER PUBLICATIONS

Ahlgren et al, Network Probing Using Packet Trains, pp. 1-6, Mar. 1999.*

Melander et al, A New End-to-End Probing and Analysis Method for Estimating Bandwidth Bottlenecks, IEEE, pp. 415-420, 2000.*

Hu et al, Evaluation and Characterization of Available Bandwidth Probing Techniques, IEEE, pp. 879-894, 2003.*

Seong-ryong Kang, et al, "Packet-pair bandwidth estimation: Stochastic analysis of a single congested node," *Proceedings of the 12th IEEE International Conference*, Berlin, Germany, Piscataway, NJ, (Oct. 5-8, 2004), pp. 316-325.

(Continued)

*Primary Examiner*—Frank Duong

(57) ABSTRACT

By approximating a packet network, such as the Internet, by an M/M/1 queuing model, the available bandwidth of the network can determined from the variance of the distribution of the sojourn times of packets transmitted through the network. In order to determine the variance of the distribution of sojourn times, and thus the bandwidth of the packet network that is available for transport of packets from an input to an output, a probe train of N packets with known inter-packet intervals is injected from an input on a sending side of the network. At the receiving side of the network, the packet arrival times are measured and the inter-packet intervals of each pair of received packets in the received train are calculated and compared with the known inter-packet interval times of the corresponding input packets. The variance of the distribution of the sojourn times of the packets through the network can then calculated using these time differences even though the individual sojourn times of the packets through the network cannot be directly measured.

12 Claims, 2 Drawing Sheets

OTHER PUBLICATIONS

Constantinos Dovrolis, et al, "What do packet dispersion techniques measure?" *20th Annual Joint Conference of the IEEE Computer and Communications Societies*, Anchorage, AK, vol. 1 of 3, (Apr. 22, 2001), pp. 905-914.

European Search Report, Appl. No. 05257055.3-2416, (Feb. 2, 2006).

Jacob Strauss et al., "A Measurement Study Of Available Bandwidth Estimation Tools", IMC'03, Oct. 27-29, 2003, Miami Beach, Florida, USA., 6 pages.

Vinay J. Ribeiro et al., "pathChirp: Efficient Available Bandwidth Estimation for Network Paths", Passive and Active Measurement Workship, PAM2003, Apr. 6-8, 2003, La Jolla, CA., 11 pages.

* cited by examiner

METHOD AND APPARATUS OF ESTIMATING AVAILABLE BANDWIDTH ON A PACKET NETWORK

TECHNICAL FIELD

This invention relates to a packet transport network, such as the Internet, and, more particularly, to a method of estimating the available bandwidth on the network at a network input.

BACKGROUND OF THE INVENTION

The available bandwidth in a packet network, such as the Internet, is not a constant, but is continually changing due to various factors. These factors include the amount of traffic currently being transported over the network as well as the servicing time that routing points need to get packets from one node to the next within the network. Overloading the network beyond its bandwidth capability is likely to cause dropping of packets and/or unacceptable packet delays between the network input and network output. Depending on the type of data traffic being transported, certain minimum Quality of Service (QoS) needs to be provided for acceptable service. For example, in a conversational class of service, packets need to arrive at their destination within a minimum time window in order to provide a natural conversational environment. Similarly, packets containing streaming video or music need to arrive with minimum delay variance (jitter) otherwise the decoded video or music will not flow naturally and will be "jerky". On the other hand, packets containing an email message or packets containing non-streaming music that is being downloaded can be carried in a background class of service that is less sensitive to packet delays since packet delays on such information have little, if any, perceptual effect. Knowledge of the available bandwidth at an input side of the packet network facilitates a more intelligent control of packet flows into the network, thereby maximizing QoS conformance. Thus, if the current available bandwidth is small, delay-insensitive packet flows can be held back with a higher priority given to those packet flows of data that are more delay sensitive. If the available bandwidth is large, priorities can be assigned differently. In the context handling wireless packet data traffic, knowledge of the available bandwidth facilitates rate control to signal all transmitting wireless terminals and intermediate routing/switching nodes to increase or decrease their transmission rates so as to provide all transmitting terminals with some continuing data flows such that the total bandwidth usage does not exceed the network's available bandwidth. This will also further the need to optimally use the available bandwidth.

The problem with estimating the available bandwidth is multifold. For example, the aggregate amount of time service points in the network take to route packets is an unknown as is the knowledge of the amount of traffic being carried on the network from other sources. Available bandwidth can be determined from the difference between the total capacity of the packet network (such as the Internet) and the amount of bandwidth being currently utilized. These two factors, however, can't be readily measured independently. Various prior art methodologies have been proposed for determining available bandwidth. One method, known as the "pathchirp" method, floods the network with packets until it is unable to accept any additional traffic. The traffic being inputted at point is determined to be the total current capacity of the network at that input. Disadvantageously, this method loads the network and interferes with ongoing traffic. Further, this method can lead to completely false results when two different nodes are trying to estimate the available bandwidth at the same time since each flooding traffic will appear at utilized bandwidth to the other. In another method, a first test packet is inputted into the network to join the queue for transmission followed by a second packet that must join the queue before the first packet gets processed and transmitted through the network. The delay between these packets at the receiving end as compared to the delay between these packets at the input is used as a measure of the delay currently being imparted to packets as they sojourn the network between that input and output. This will yield the utilized bandwidth of the network. Thus, in order to determine the available bandwidth, equal as noted above, to the difference between the total network capacity and the utilized bandwidth, the total network capacity is required. Although there are methods to determine the total capacity, the two algorithms in conjunction are too complex for practical use. Furthermore, this method requires that both packets enter and remain in the input queue simultaneously before the network processes the first packet. In addition to the need to know the total network capacity, this method of measuring delay is difficult to conduct since it is difficult to adjust packet timing so as to guarantee that the second packet enters the queue before the first packet is processed.

SUMMARY OF THE INVENTION

In accordance with an embodiment of the present invention, the inventors have approximated a packet transport network, such as the Internet, by an M/M/1 queuing model, a Poisson arrival, exponential service time distribution/single server system, by considering the entire network as a single entity that provides transport service. In a M/M/1 queuing model, the statistical variance of the distribution of the sojourn time (the sum of processing time plus wait time in the queue) of a transmitted packet train is disclosed in a closed form as the reciprocal of the square of the difference between the service rate and arrival rate of Poisson-distributed events. In the packet transport network, the service rate is the amount of time the nodes within the network take to process data packets and transport them through the network, which has been analogized by the inventors to represent the capacity of the network. In the packet network, the arrival rate is the rate of arrival of extraneous data packets in the network that are unrelated to a packet train desired to be transmitted from a network input, which has been analogized to represent the current usage of the network. The difference between the capacity and the current usage of the network thus represents the bandwidth available to serve the packet train to be transmitted from the network input. Accordingly, the available bandwidth has been determined from this M/M/1 model of the packet network to be equal to the reciprocal of the square root of the variance of the distribution of the sojourn times of packets through the network.

In order to determine the variance of the distribution of the sojourn times, and thus the bandwidth of the packet network that is available for transport of packets from an input to an output, a probe train of N packets with known inter-packet intervals is injected from an input on a sending side of the network. At the receiving side of the network, the packet arrival times are measured and the inter-packet intervals of each pair of received packets in the received train are calculated and compared with the known inter-packet interval times of the corresponding input packets. The variance of the distribution of the sojourn times of the packets through the network can then calculated using these time differences even though the individual sojourn times of the transmitted packets cannot be directly measured.

Specifically, the variance is calculated by first determining the differences between the inter-packet intervals between each pair of received packets and the known inter-packet intervals between each corresponding pair of packets in the input probe train. For each packet j in the received pulse train, the sum over all k, for k=1 to N, is calculated of the difference between the inter-packet interval between packets j and k in the output packet train and the inter-packet interval between corresponding packets j and k in the input probe train. That sum, representing the difference of sojourn times for packet j against all other packets in the output train, is divided by N to yield the deviation of the sojourn time for packet j from the mean sojourn time. The variance of the sojourn times for packets 1–N is then determined by calculating the average over N of the sum of the squares of the deviation from the mean sojourn time of each packet j for j=1 to N. The available bandwidth can then be estimated from square root of the reciprocal of the variance using the M/M/1 model of the packet network. The estimated available bandwidth can them be fed back to the network input to control the packet flows into the network.

DETAILED DESCRIPTION

Figure 1:
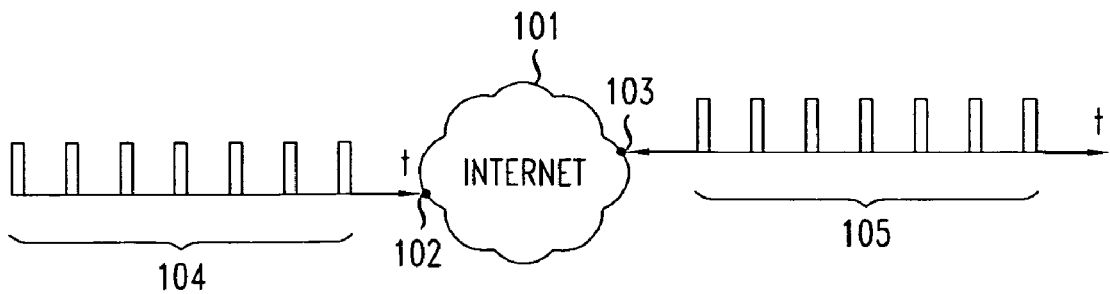
FIG. 1 is a block diagram showing a the transportation of a packet train through a packet network such as the Internet.

With reference to FIG. 1, a packet network 101, such as the Internet, is shown having an input 102 and an output 103. As previously noted, the bandwidth available at the input is not a constant but changes dynamically due to fluctuations in extraneous loads on the network from other (not shown) inputs. Without information on the bandwidth that is available to input packet trains, QoS guarantees for these packet transmissions from the input cannot be reliably made because certain amounts of bandwidth cannot be reserved.

Since each packet that traverses the network from input to output doesn't necessarily follow the same path, the sojourn time of a packet through the network is not constant from packet to packet since different routing points within the network may take longer than others in processing packets at they route packets from node to node in the network, and the time a packet waits in an input queue for processing by the network once it has been injected into the network is dependent on various factors including the encountered load within the network. Thus, an input train 104 of packets with a known inter-packet spacing is likely to become an output train of packets 105 with different inter-packet spacing due to the different sojourn time each packet is likely to encounter as it travels through the network 101 from input 102 to output 103, where the sojourn time of a packet is equal to the sum of the waiting time at the input plus the processing time of the packet through the network. The M/M/1 queue model presents a comprehensive view of the system with its effective service rate and available bandwidth.

Figure 2:
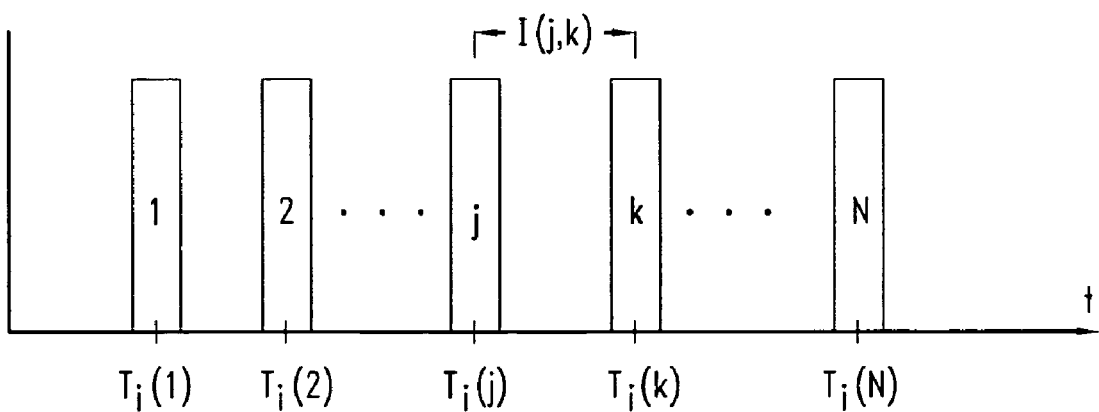
FIG. 2 shows the relationship between the timing of packets in an input probe train.

In accordance with an embodiment of the invention, the available bandwidth of the packet network 101 can be estimated from the variance of the sojourn times of a probe train of test packets with known inter-packet intervals that are injected into the network and transmitted to an output. Since the sojourn times through the network of the injected packets cannot be individually measured (the time at which a packet it injected into the network is not known at the receiving end), the variance of the sojourn times is determined as follows:

At the input 102 of the network 101 where an estimate of the available bandwidth is desired, the probe train of packets with known inter-packet intervals is injected. FIG. 2 shows this input probe train consisting of N packets with known inter-packet intervals. I(j,k), the interval between packets j and k, is given by:

$$I(j,k)=T_i(k)-T_i(j) \quad (1)$$

where $T_i(j)$ is the time the jth packet is injected into the network and $T_i(k)$ is the time the kth packet is injected into the network. I(j,k) is parameter with known values, where the inter-packet intervals are typically equal for consecutive j and k.

Figure 3:
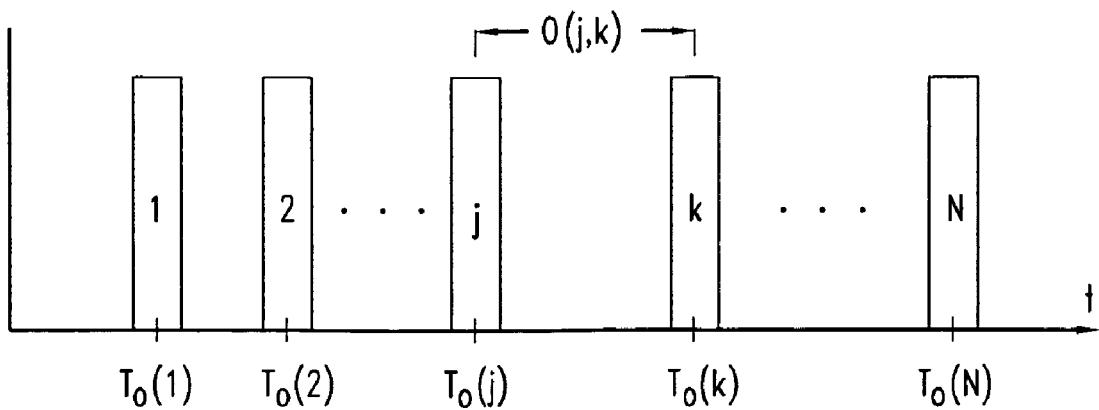
FIG. 3 shows the relationship between the timing of packets in the corresponding train of packets.

At the output side of the network at output 103, the received probe train is collected and the arrival time of each packet is measured and the inter-packet intervals are calculated. FIG. 3 shows the corresponding output train consisting of N packets. In the output train, O(j,k) is the interval between packets j and k, and is given by:

$$O(j,k)=T_o(k)-T_o(j) \quad (2)$$

where $T_o(j)$ is the time of arrival of the jth packet and $T_o(k)$ is the time of arrival of the kth packet at the receiving end.

The time of arrival of packet k, $T_o(k)$, is given as:

$$T_o(k)=T_i(k)+S(k) \quad (3)$$

where S(k) is the sojourn time of the kth packet within the network.

O(j,k) can thus be written as:

$$O(j,k)=T_i(k)+S(k)-[T_i(j)+S(j)]=I(j,k)+S(k)-S(j). \quad (4)$$

The difference between the output interval between packets j and k and the input interval between packets j and k, defined as DS(j,k) is given as:

$$DS(j,k)\equiv O(j,k)-I(j,k)=S(k)-S(j). \quad (5)$$

Although the individual sojourn times S(j) and S(k) of packets j and k cannot be individually measured since there is no knowledge of when packets j and k were injected into the network and no synchronization can be assumed between the end points, DS(j,k) can be determined per equation (5) from the difference between the measurable arrival times of packets j and k at the output and the known inter-packet spacing between packets j and k in the input probe train of N packets.

By considering the entire network as a single entity that provides transport service, the packet network between the input and the output can be approximated as an M/M/1 queue, a Poisson arrival, exponential service time distribution/single server system. According to the underlying M/M/1 model, the sojourn times of the packets are exponentially distributed random variables. The sojourn times of packets transmitted through the network that are exponentially distributed have the following mean and variance:

$$\text{Mean} = \frac{1}{(\mu - \lambda)}, \quad (6)$$

and $$\text{Variance} = V = (\text{mean})^2 = \left(\frac{1}{(\mu - \lambda)}\right)^2, \quad (7)$$

where $\mu$ is equal to the mean service rate and $\lambda$ is equal to the mean arrival rate.

The service rate is the amount of time that nodes take in processing packets transported through the network. The inventors have insightfully analogized that the means service rate can be associated with the total capacity of the packet network. This analogy can be made because the service rate expresses in aggregate the network's total capability to process packets in order to transport them from one end point to another. The mean arrival rate is the rate of arrival of extraneous packets in the network that are unrelated to the transmitted packet train. The inventors have insightfully analogized that the arrival rate is equivalent to the bandwidth used in the network by others. The reason why arrival rate can analogized to the used bandwidth is that the packets being served in aggregate during the time that the transmitted packets are going through the transport network represent the body of packets that the transport network is processing. The difference between the total capacity (service rate) and the bandwidth currently being used by others (arrival rate) is equal to the currently available bandwidth, that is, the bandwidth available to serve the packet train to be transmitted onto the network from the network input.

The variance (V) of the sojourn times can thus be approximated as:

$$V \approx \left(\frac{1}{ABW}\right)^2, \quad (8)$$

where ABW is the available bandwidth.

The available bandwidth can thus be approximated from the variance of the sojourn times from:

$$ABW = \frac{1}{\sqrt{V}}, \quad (9)$$

where ABW is expressed as the number of serviceable packets per second. Equivalently, ABW can be expressed in bits per second as:

$$ABW_{bps} = PS * ABW. \quad (10)$$

where PS is the size of an IP packet expressed in bits.

The variance of the sojourn times is determined as follows:

Firstly, the difference in sojourn times for packet j against all other packets in the output train less the corresponding inter-packet time differences in the input packet train is defined as D(j) and given as:

$$D(j) = \sum_{k=1}^{N} DS(j,k) = \sum_{k=1}^{N} (S(k) - S(j)) = \sum_{k=1}^{N} S(k) - N * S(j). \quad (11)$$

D(j) can be calculated from the sum of the differences over all k between the inter-packet times between packets j and k in the output packet train and the inter-packet times between these same packets in the input probe train. Since the inter-packet times in the input probe train are known and the arrival times between packets in the output train are observable, D(j) can readily be determined.

The mean of D(j) over all N packets is given as:

$$d(j) = \frac{D(j)}{N} = \left(\frac{1}{N}\right) * \left(\sum_{k=1}^{N} S(k) - N * S(j)\right) = \left(\frac{1}{N}\right) * \sum_{k=1}^{N} S(k) - S(j) = E(S) - S(j) \quad (12)$$

where E(S) is equal to the mean of sojourn times:

$$E(S) = \left(\frac{1}{N}\right) * \sum_{k=1}^{N} S(k). \quad (13)$$

From equations (12) and (13), therefore, d(j) represents for packet j, the amount that its sojourn time differs from the mean sojourn time of all received packets in response to the transmitted N-packet probe train and can be calculated from each D(j). The variance, V, of the sojourn time can thus be determined by considering each d(j): d(1), d(2), ..., d(N), as follows:

$$\text{Variance} = V = \left(\frac{1}{N}\right) * \sum_{j=1}^{N} (d(j))^2. \quad (13)$$

Once the variance is calculated from equation (14), the available bandwidth (in bps) can be readily calculated from equation (10).

The available bandwidth, once estimated at the output 103 of network 101 in FIG. 1, can be transmitted back to the input 102 for purposes of controlling, for example, the flow of packets into the network in order to maintain a desired QoS. For example, if the packet network is carrying wireless data traffic, the estimated available bandwidth can be used to facilitate rate control to signal all wireless network elements to increase or decrease their transmission rates in a manner that provides all currently active data flows with some continuing data flows such that the total bandwidth usage does not exceed the network's available bandwidth.

Figure 4:
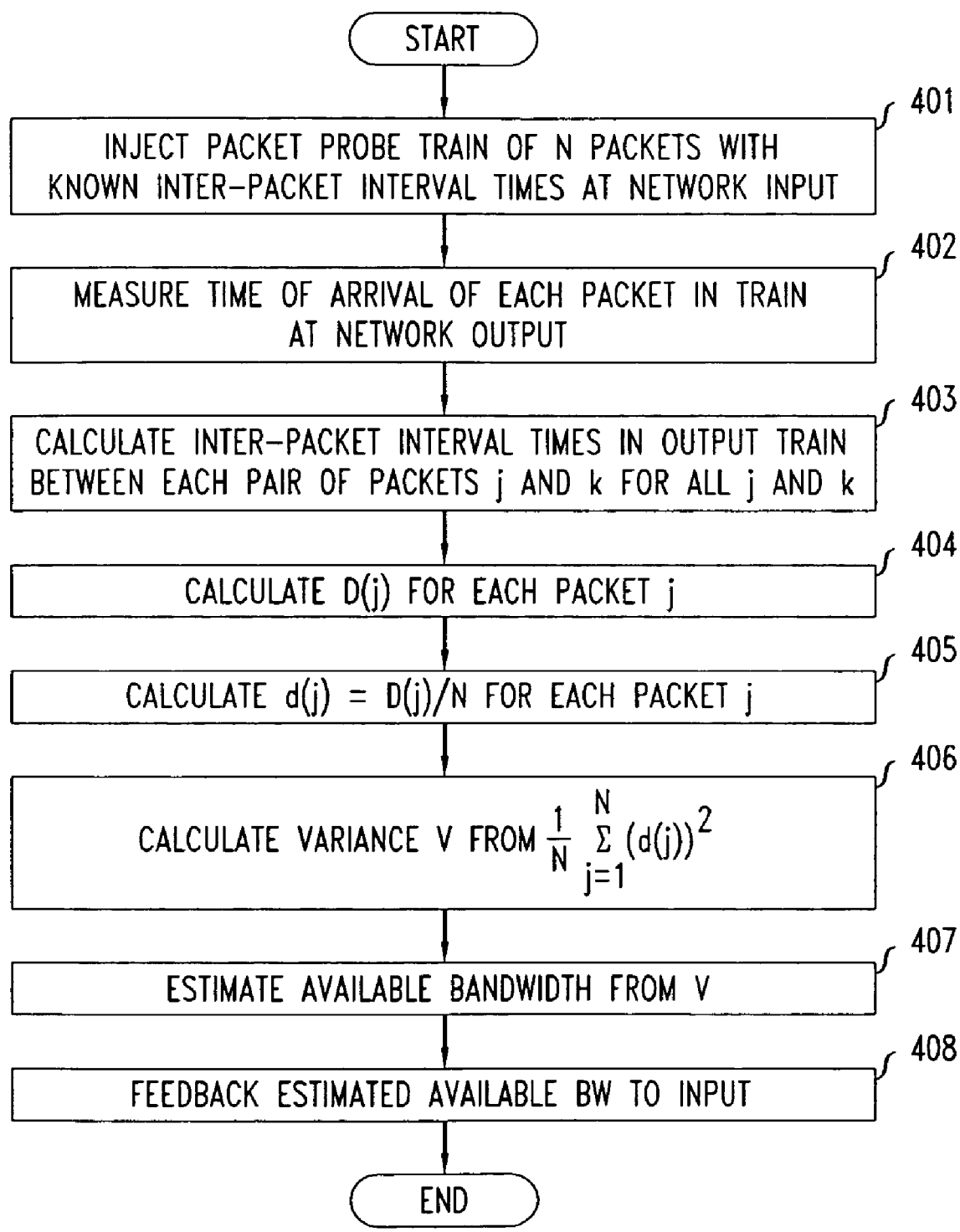
FIG. 4 is a flowchart showing the steps of the methodology of an embodiment of the present invention.

With reference to FIG. 4, a flow chart is shown that summarizes the methodology of determining the available bandwidth of a packet network in accordance with the described embodiment of the present invention. At step 401 a packet probe train of N packet having known inter-packet interval times is injected in the network at an input. At step 402, the time of arrival of each packet in the train is measured at the network output. At step 403, the inter-packet interval times in the output train between each pair of packets j and k for all j and k between 1 and N are calculated. At step 404, for each packet j, the sum over all k of the differences between the interval time between packets j and k in the output train and the interval time between corresponding packets j and k in the input train is calculated (D(j)). At step 405, for each j, the average over all N of each D(j) is calculated (d(j)), representing for packet j the difference its sojourn time differs from the mean sojourn time for all packets in the train. At step 406, the variance (V) of sojourn times is calculated from the average over N of the sum of the squares of d(j) for each packet j. At step 407, the available bandwidth is estimated from the variance. At step 408, the estimated available is fed back to the input to control and manage traffic flows or for other purposes.

The methodology described above can be implemented in software, in hardware, or in a combination of hardware and software in a manner well known to those skilled in the art. The hardware and/or software could be located anywhere in the packet network or accessible to the packet network, such as a server or other device connected to the network. The determined available bandwidth of the packet network can be transmitted back to the input either via the network or outside the network. The available bandwidth can be determined periodically or a periodically.

The above-described embodiment is illustrative of estimating the available bandwidth of a packet network and merely illustrates the principles of the invention. It will thus be appreciated that those skilled in the art will be able to devise various arrangements, which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the diagrams herein represent conceptual views illustrating the principles of the invention.

In the claims hereafter, any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicants thus regard any means which can provide those functionalities as equivalent as those shown herein.

The invention claimed is:

1. A method of estimating available bandwidth of a packet network comprising the steps of:

determining the inter-packet intervals in a received train of packets that were injected into the network with known inter-packet intervals;

determining a variance of a distribution of sojourn times through the network of the packets in the received train of packets from the determined inter-packet intervals and the known inter-packet intervals; and estimating the available bandwidth of the packet network from the determined variance;

wherein the step of determining a variance of a distribution of sojourn times comprises:

a) determining for each packet j in the received train of N packets the difference of sojourn times for packet j against all other packets in the received train by calculating the sum over each packet k of the difference between the inter-packet interval between packets j and k and the known inter-packet interval between packets j and k in the train of packets injected into the network;

b) determining the deviation of the sojourn time for each packet j from the mean sojourn time of the packets in the train by dividing the sum calculated in step a) for each packet j by N; and c) determining the variance of the distribution of sojourn times of all the packets in the received train by calculating the average over N of the sum of the squares of the deviations determined in step b) of each packet j.

2. The method of claim 1 wherein the packet network is the Internet.

3. The method of claim 1 further comprising the step of sending the determined available bandwidth of the packet network to an input of the network to control packet flows into the network.

4. The method of claim 1 wherein the step of estimating the available bandwidth from the determined variance comprises calculating the reciprocal of the square root of the determined variance.

5. Apparatus for estimating available bandwidth of a packet network comprising:

means for determining the inter-packet intervals in a received train of packets that were injected into the network with known inter-packet intervals;

means for determining a variance of a distribution of sojourn times through the network of the packets in the received train of packets from the determined inter-packet intervals in the received train and the known inter-packet intervals; and means for estimating the available bandwidth of the packet network from the determined variance;

wherein the means for determining a variance of sojourn times comprises:

means for calculating for each packet j in the received train of N packets the sum over each packet k of the difference between the inter-packet interval between packets j and k and the known inter-packet interval between packets j and k in the train of packets injected into the network to determine the difference of sojourn times for packet j against all other packets in the received train;

means for dividing by N the sum for each packet j of the calculated differences between inter-packet intervals in the output train and corresponding intervals in the input train to determining the deviation of the sojourn time for each packet j from the mean sojourn time; and means for determining the variance of the sojourn times for all the packets in the received train by calculating the average over N of the sum of the squares of the deviations determined for each packet j by the means for dividing.

6. The apparatus of claim 5 wherein the packet network is the Internet.

7. The apparatus of claim 5 further comprising means for sending the determined available bandwidth of the packet network to an input of the network to control packet flows into the network.

8. The apparatus of claim 5 wherein the means for estimating the available bandwidth from the determined variance calculates the reciprocal of the square root of the determined variance.

9. A computer readable media tangibly embodying a program of instructions executable by a computer to perform a method, the method comprising the steps of:
   determining the inter-packet intervals in a received train of packets that were injected into the network with known inter-packet intervals;
   determining a variance of a distribution of sojourn times through the network of the packets in the received train of packets from the determined inter-packet intervals and the known inter-packet intervals; and
   estimating the available bandwidth of the packet network from the determined variance;
   wherein in the method the step of determining a variance of sojourn times comprises:
   a) determining for each packet j in the received train of N packets the difference of sojourn times for packet j against all other packets in the received train by calculating the sum over each packet k of the difference between the inter-packet interval between packets j and k and the known inter-packet interval between packets j and k in the train of packets injected into the network;
   b) determining the deviation of the sojourn time for each packet j from the mean sojourn time of the packets in the train by dividing the sum calculated in step a) for each packet j by N; and
   c) determining the variance of the sojourn times of all the packets in the received train by calculating the average over N of the sum of the squares of the deviations determined in step b) of each packet j.

10. The computer readable media of claim 9 wherein in the method the packet network is the Internet.

11. The computer readable media of claim 9 wherein the method further comprises the step of sending the determined available bandwidth of the packet network to an input of the network to control packet flows into the network.

12. The computer readable media of claim 9 wherein in the method the step of estimating the available bandwidth from the determined variance comprises calculating the reciprocal of the square root of the determined variance.

* * * * *